US00RE40604E

(19) United States
(12) Reissued Patent
Pruitt et al.

(10) Patent Number: US RE40,604 E
(45) Date of Reissued Patent: Dec. 16, 2008

(54) ROTARY MOWER CONDITIONER HAVING IMPROVED CUT CROP FLOW

(75) Inventors: Martin E. Pruitt, Hesston, KS (US); Kurt Graber, Moundridge, KS (US); Cecil L. Case, deceased, late of Newton, KS (US); Michael L. O'Halloran, Hesston, KS (US)

(73) Assignee: AGCO Corporation, Duluth, GA (US)

(21) Appl. No.: 10/765,030

(22) Filed: Jan. 26, 2004

Related U.S. Patent Documents

Reissue of:
(64) Patent No.: 6,158,201
Issued: Dec. 12, 2000
Appl. No.: 09/153,290
Filed: Sep. 15, 1998

(51) Int. Cl.

| | |
|---|---|
| ***A01D 75/30*** | (2006.01) |
| ***A01D 34/44*** | (2006.01) |
| ***A01D 34/66*** | (2006.01) |
| ***A01D 43/00*** | (2006.01) |
| ***A01D 61/00*** | (2006.01) |

(52) U.S. Cl. ..... 56/6; 56/13.9; 56/16.4 R; 56/157

(58) Field of Classification Search ..... 56/6, 56/13.5, 13.9, 15.1, 15.2, 15.6, 16.4 R, 255, 56/295, 157, 192, DIG. 1, DIG. 6, DIG. 9, 56/DIG. 11

See application file for complete search history.

(56) References Cited

U.S. PATENT DOCUMENTS

| | | | |
|---|---|---|---|
| 2,319,292 | A | 5/1943 | Boggs |
| 2,523,014 | A | 9/1950 | Gooch |

(Continued)

FOREIGN PATENT DOCUMENTS

| | | | |
|---|---|---|---|
| CA | 2166671 | | 4/1997 |
| CA | 2166671 | A * | 4/1997 |
| DE | 324170 | A1 | 12/1983 |
| DE | 32 24 170 | | 12/1983 |

(Continued)

OTHER PUBLICATIONS

Brochure, KRONE AM Disc Mowers, coded VDV 10–3.88.
Brochure, KRONE High Performance Disc Mower AMG 282, coded Nie 20–5.88.
Brochure, Deutz–Fahr Rotary Mowers, Coded 9147810 Printed in West Germany 8708.
Brochure, KRONE Die Krone–Frontescheibenmäher AFL 242 Z und 282 Z; AFL 243 RS und 283 RS, Coded Nie AFL 20–11.93.
Brochure, Niemeyer, Forage Harvesting with Niemeyer—1992, Coded FU N02/92G–90363.

*Primary Examiner*—Thomas B. Will
*Assistant Examiner*—Alicia Torres
(74) *Attorney, Agent, or Firm*—Hovey Williams LLP

(57) ABSTRACT

A mower conditioner includes a rotary style cutter bed and a pair of laterally extending crop conditioning rolls spaced rearwardly from the cutter bed. Crop flow is improved in the machine by a laterally extending conveying roller located between the cutter bed and the nip defined by the conditioning rolls. In particular, the conveying outer roller serves to lift cut crop up from the cutter bed and convey the crop rearwardly to the nip. This ensures that the cut crop moves in a steady stream from the cutter bed to the conditioning rolls, and thereby reduces the risk of cut crop being thrown forwardly by the cutters. A downwardly open area is preferably defined between the conveying roller and the cutter bed to provide a space through which dirt and debris can drop out of the machine. The conveying roller preferably has a rotational axis that is lower than the rotational axis of the lower conditioning roll and generally vertically aligned with the substantially planar cutting zone defined by the cutter bed.

36 Claims, 6 Drawing Sheets

U.S. PATENT DOCUMENTS 2,698,170 A 12/1954 Foley
2,765,611 A 10/1956 King
2,777,272 A 1/1957 Smith et al.
2,906,077 A * 9/1959 Hale et al. ..... 56/1
2,992,466 A 7/1961 Gallagher
3,014,324 A 12/1961 McCarty
3,027,701 A 4/1962 Campbell
3,306,015 A 2/1967 Myers
3,673,779 A * 7/1972 Scarnato et al. ..... 56/DIG. 1
3,774,380 A 11/1973 Ancellin
3,857,225 A 12/1974 Knudson
3,999,359 A 12/1976 Jordan et al.
4,126,989 A 11/1978 Oosterling et al.
4,147,016 A 4/1979 Jensen et al.
4,166,350 A 9/1979 Werner
4,185,445 A * 1/1980 van Der Lely ..... 56/6
4,187,664 A 2/1980 Meek et al.
4,244,163 A 1/1981 Gantzer
4,253,294 A 3/1981 Zweegers
4,283,905 A 8/1981 van der Lely
4,330,982 A 5/1982 Vissers et al.
4,476,666 A * 10/1984 van der Lely et al. ..... 56/13.6
4,487,003 A 12/1984 Mathews et al.
4,525,987 A 7/1985 Werner et al.
4,531,349 A 7/1985 Ehrhart et al.
4,567,716 A 2/1986 Makofka et al.
4,637,201 A * 1/1987 Pruitt et al.
4,693,062 A 9/1987 van der Lely et al.
4,703,612 A 11/1987 Webster
4,719,742 A 1/1988 Ermacora et al.
4,759,172 A 7/1988 Purrer et al.
4,809,488 A 3/1989 Neuerburg et al.
4,838,013 A 6/1989 Louet Feisser et al.
4,843,804 A * 7/1989 Wellman ..... 56/16.4
4,858,418 A 8/1989 von Allwoerden
4,860,527 A 8/1989 Maarten
4,879,870 A 11/1989 Neuerburg
4,896,491 A 1/1990 Warnsholz et al.
4,899,523 A 2/1990 Frumholtz et al.
4,909,023 A 3/1990 Haberkorn et al.
4,986,061 A 1/1991 Frumholtz et al.
4,986,064 A 1/1991 Ermacora
5,012,635 A * 5/1991 Walters et al. ..... 56/6
5,060,462 A 10/1991 Helfer et al.
5,086,613 A 2/1992 Fox et al.
5,094,063 A 3/1992 Wattron et al.
5,143,137 A 9/1992 West
5,148,580 A 9/1992 Dyckow
5,172,539 A 12/1992 Jennnings et al.
5,179,822 A 1/1993 McLean
5,272,859 A 12/1993 Pruitt et al.
5,279,100 A 1/1994 Pruitt et al.
5,337,544 A 8/1994 Lauritsen
5,345,752 A 9/1994 Pruitt et al.
5,421,145 A 6/1995 Pruitt et al.
5,430,997 A 7/1995 O'Halloran et al.
5,433,064 A * 7/1995 Schmitt et al. ..... 56/6
5,463,852 A * 11/1995 O'Halloran et al.
5,471,825 A 12/1995 Panoushek et al.
5,519,989 A * 5/1996 Shelbourne et al. ..... 56/13.5
5,566,535 A 10/1996 Pruitt
5,768,865 A * 6/1998 Rosenbalm et al. ..... 56/6
5,842,330 A * 12/1998 Richardson et al. ..... 56/6

FOREIGN PATENT DOCUMENTS

DE 3224851 A1 1/1985
DE 3501 133 7/1986
DE 3501133 7/1986
EP 001661 5/1979
EP 0 116 661 8/1984
EP 0277343 B1 12/1987
EP 0 358 045 3/1990
EP 0358045 B1 3/1990

* cited by examiner

FIG. 1.
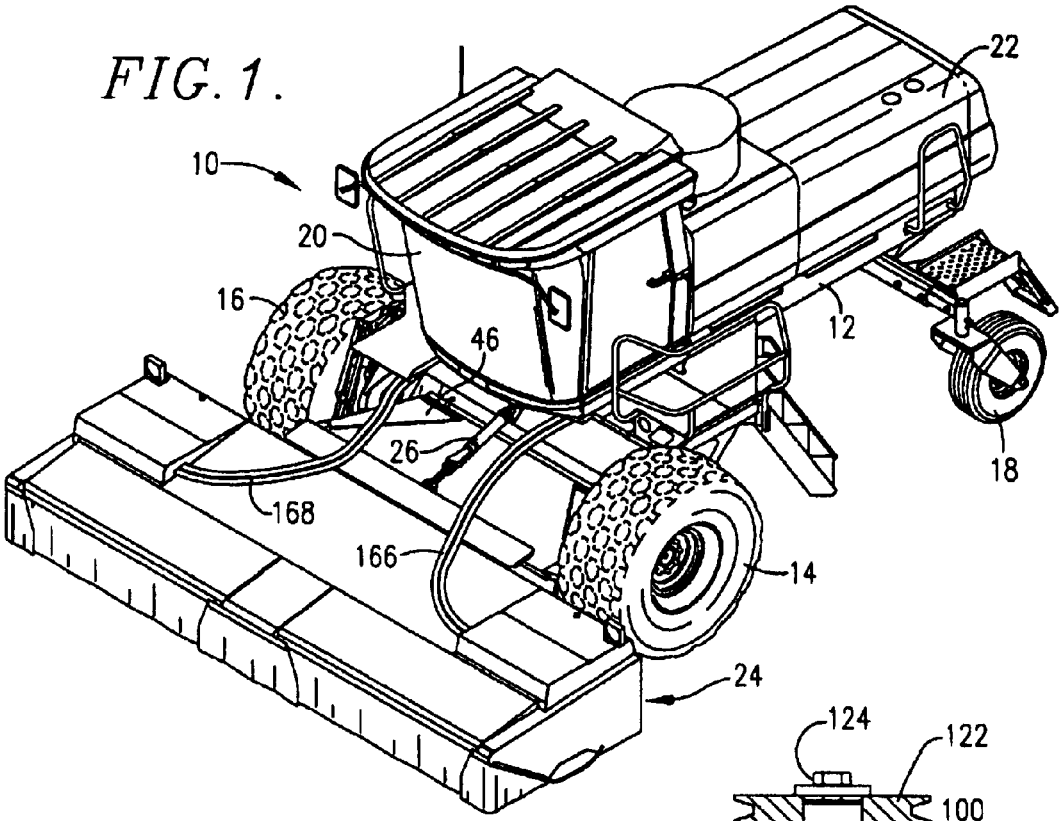
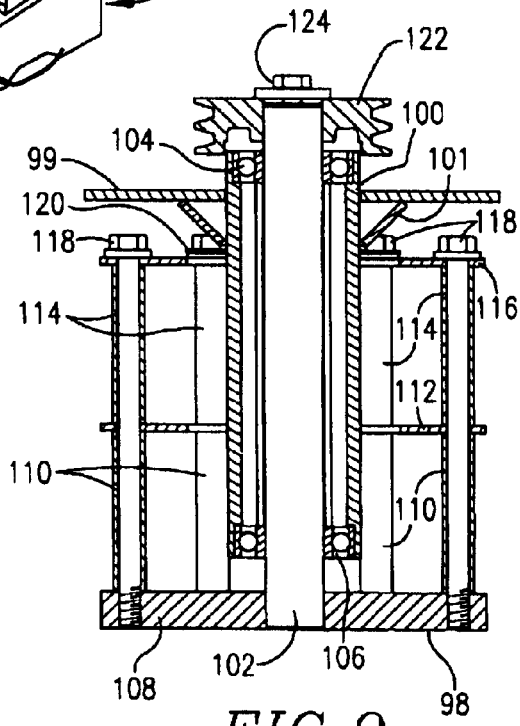
FIG. 9.
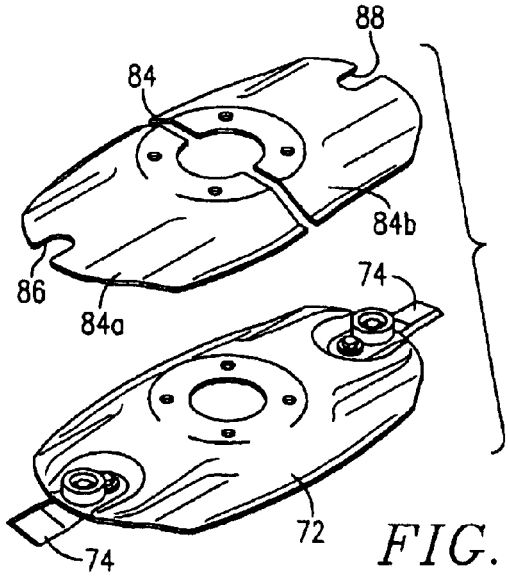
FIG. 10.

ROTARY MOWER CONDITIONER HAVING IMPROVED CUT CROP FLOW

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to crop harvesting equipment. More particularly, the present invention concerns a mower/conditioner having structure for conveying cut crop from the cutter bed to the conditioning rolls, so as to improve crop flow through the machine.

2. Discussion of Prior Art

Those ordinarily skilled in the art will appreciate that smooth, even crop flow through the mower/conditioner is critical to proper, trouble-free harvesting operations. However, it has been determined that there is often a problem with crop flow in machines utilizing a pair of laterally extending crop conditioning rolls. Specifically, it is believed that the crop material has difficulty in moving from the cutter to the upwardly and rearwardly spaced nip defined between the conditioning rolls. This is particularly troublesome in machines utilizing a rotary style cutter bed, wherein crop material not adequately transferred to the nip is likely to be carried forwardly by the rotary cutters and ejected out the front of the machine. It will be appreciated that material thrown forward of the machine will have a tendency to known down standing crop, which is further detrimental to harvesting operations. In addition, crop material failing to move directly from the cutter bed to the conditioning rolls must recycle through the cutter bed and is consequently overly shredded/comminuted. These problems are magnified in machines having wide cutter beds with at least one cutter located outboard of the ends of the conditioning rolls, whereby crop material must also be gathered inwardly after severance before being directed through the shorter conditioning rolls.

OBJECTS AND SUMMARY OF THE INVENTION

Responsive to these and other problems, an important object of the present invention is to provide a mower/conditioner having, unimpeded even cut crop flow therethrough. In particular, an important object of the present invention is to provide a machine having laterally extending crop conditioning rolls with structure for conveying cut crop from the crop cutting assembly to the conditioning rolls, so as to improve crop flow through the machine. Another important object of the present invention is to provide a mower/conditioner having a rotary style cutter bed with a conveying element for transferring crop material cut by the rotary cutters upwardly and rearwardly to the nip defined between the crop conditioning rolls. It is also an object of the present invention to provide a mower/conditioner having a cutters located outboard of the crop conditioning rolls with structure for improving crop flow between the outboard cutters and the crop conditioning rolls.

In accordance with these and other objects evident from the following description of the preferred embodiment, the present invention concerns a harvesting machine including a crop cutting assembly defining a cutting zone, and a pair of laterally extending crop conditioning rolls defining a nip therebetween that is spaced upwardly and rearwardly from the cutting zone. Crop flow is improved in the machine by a conveying element having at least a portion thereof that is moveable upwardly and rearwardly between the cutting zone and the nip, so as to ensure smooth, even crop flow from the cutting assembly to the conditioning rolls. The conveying element preferably comprises a laterally extending, rotatable roller having an outer periphery that defines the upwardly and rearwardly moveable portion of the conveying element. The preferred embodiment includes a downwardly open area defined between the conveying roller and the cutting assembly to provide a space through which dirt and debris can drop out of the machine.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein:

FIG. 1 is a perspective view of a self-propelled mower conditioner constructed in accordance with the principles of the present invention;

FIG. 9 is an enlarged vertical sectional view of the intermediate impeller cage suspended from the header framework; and FIG. 10 is an enlarged perspective view of the right outermost cutter and the lifter that is attached to the carrier plate of the cutter.

DETAILED DESCRIPTION OF THE PREFERRED EMBODIMENTS

Figure 3:
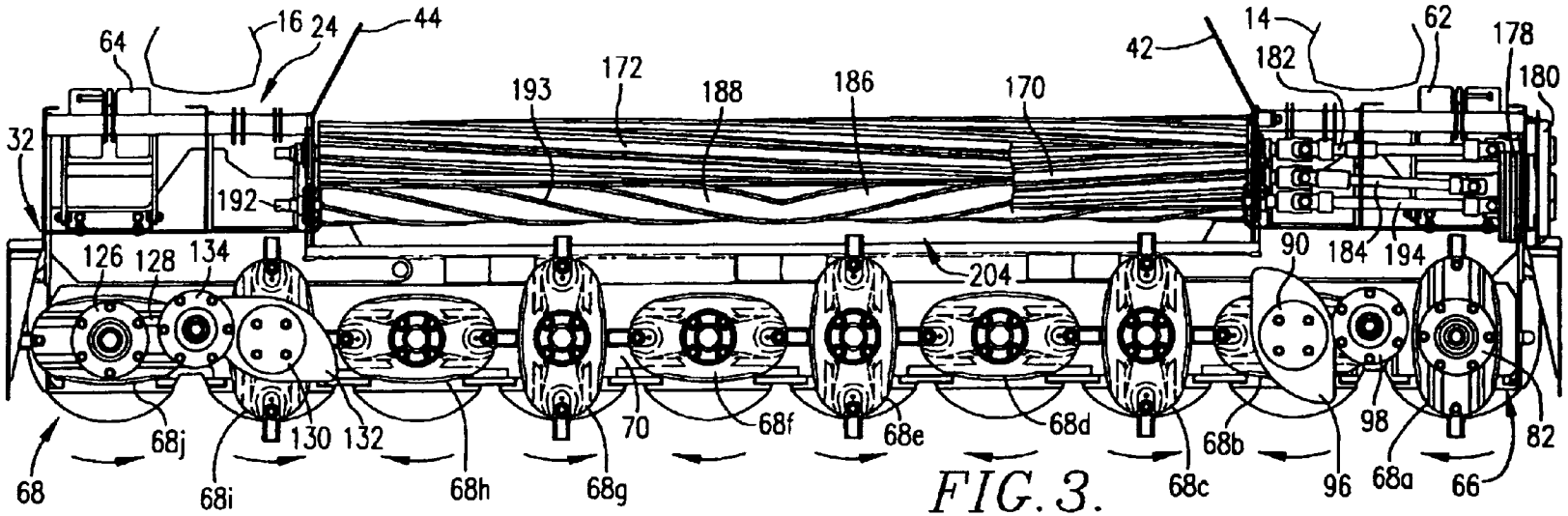
FIG. 3 is an enlarged top plan view of the harvesting header shown in FIG. 1, with parts being broken away to illustrate the cutter bed, the crop conditioning rolls and the laterally extending crop conveying roller operable to convey crop from the cutter bed upwardly and rearwardly to the nip defined by the crop conditioning rolls.

Turning initially to FIG. 1, the harvester selected for illustration comprises a self-propelled mower/conditioner 10 including a chassis or frame 12 supported by front drive wheels 14,16 and rear caster wheels 18 (only the left rear wheel being shown in the drawing figures) for movement across a field to be harvested. The frame 12 carries a cab 20, within which an operator controls operation of the mower/conditioner 10, and a rearwardly spaced compartment 22 housing a power source (not shown) such as an internal combustion engine.

The mower/conditioner 10 further includes a harvesting header 24 attached to the front end of the frame 12. Such attachment of the header 24 to the frame 12 is achieved in the traditional manner, with a pair of laterally spaced apart, lower arms (not shown) pivotally connected between the frame 12 and the side mounts 25 (only one side mount being shown in FIG. 6 and 7) of the header 24, and with a central link 26 pivotally connected between the frame 12 and the central mounts 28 and 30 of the header 24. The link 26 may take the form of a double-acting hydraulic cylinder, with extension and retraction of the cylinder being controlled by the operator in the cab 20 to remotely control the tilt angle of the header.

The header 24 is preferably configured as a modular unit and consequently may be disconnected from the lower arms and central link 26 for removal from the frame 12. Accordingly, the frame 12 is not dedicated only to those harvesting operations provided by the header 24, but may carry other modular headers designed to perform different harvesting operations. Similarly, the header 24 may be removed from the frame 12 and installed on other variously constructed mobile frames, such as pull-type implement. In this respect, it will be appreciated that the principles of the present invention are equally applicable to pull-type harvesting machines and machines dedicated only to mowing and conditioning crop.

The header 24 has framework of its own which can be described as having a generally open, box-like construction in a rectangular configuration. Such framework is broadly denoted by the numeral 32 in FIGS. 2–3 and includes a pair of tubular cross beams 34 and 36 (see FIG. 6) supported at opposite ends by side planes 38 and 40. As perhaps best shown in FIGS. 2 and 6, the central mounts 28,30 project upwardly and rearwardly from the cross beams 34,36. A pair of shield supports 42 and 44 (see FIGS. 3, 4A–4B and 5A–5B) are fixed relative to the side plates 38 and 40 to project rearwardly therefrom. The shield supports 42,44 converge rearwardly (see FIG. 3) and support the windrow forming shields, generally denoted by the reference numeral 46 in FIG. 1. A pair of laterally extending, upright outboard plates 48 and 50 project outwardly beyond the cross beams 34 and 36, with the inner ends of the outboard plates 48 and 50 defining therebetween the front boundary of a discharge opening 52 through which cut crop passes as it moves rearwardly in the headset 24. It will be noted that the inner ends of the outboard plates 48 and 50 present small rearwardly turned flanges 54 and 56 (see FIGS. 4A–4B and 5A–5B), respectively. The flanges 54,56 serve as a guide for cut crop as it moves through the discharge opening 52, and prevent crop from backflowing behind the outboard plates 48,50. Projecting forwardly from each of the outboard plates 48 and 50 is a horizontal partition wall 58 and 60, respectively, with each outboard plate and the associated partition wall defining a downwardly and forwardly open area. In the usual manner, gauge wheel assemblies 62 and 64 are attached to the framework 32 adjacent opposite ends thereof.

A laterally extending crop cutting assembly preferably in the form of a low profile, rotary style cutter bed 66 is located adjacent the front of the header framework 32 for severing crop from the ground as the harvester 10 moves across a field. The illustrated cutter board 66 includes a series of ten rotary cutters 68 spaced across the path of travel of the harvester 10 and each being rotatable about its own upright axis (see FIG. 3). For the sake of convenience, the ten cutters 68 will be denoted by the letters 68a–68j, beginning with the leftmost cutter in the series as viewed from the rear of the machine. The cutters 68a–68j are rotatably supported on an elongated, flat gear case 70 extending the full length of the cutter bed 66. The gear case 70 is hollow, as shown in FIG. 6, and contains a train of flat spur gears (not shown) that are operably engaged with one another and thus serve to distribute driving power between one another, although other forms of power distribution means may be used within the case 70 (e.g., shafts and bevel gears, belts and pulleys, or chains and sprockets).

It will be appreciated that the cutters 68a–68j are nearly identical in construction. For the sake of brevity, only one of the cutters will be described in detail herein with the understanding that the remaining cutters are similarly constructed. As perhaps best shown in FIG. 10, each of the cutters 68a–68j includes a generally elliptical, metal knife carrier 72, and a pair of free swinging knives 74 at opposites ends of the carrier 72, as well understood by those of ordinary skill in the art. As perhaps best shown in FIG. 3, each of the cutters 68a–68j is ninety degrees out of phase with respect to the adjacent cutters, inasmuch as the circular paths of travel of the knives of adjacent cutters overlap one another and must be appropriately out of phase in order to avoid striking each other. Due to the positive mechanical drive connection between the cutters 68a–68j through the spur gears in the case 70, the cutters always remain properly in phase with one another.

Figure 6:
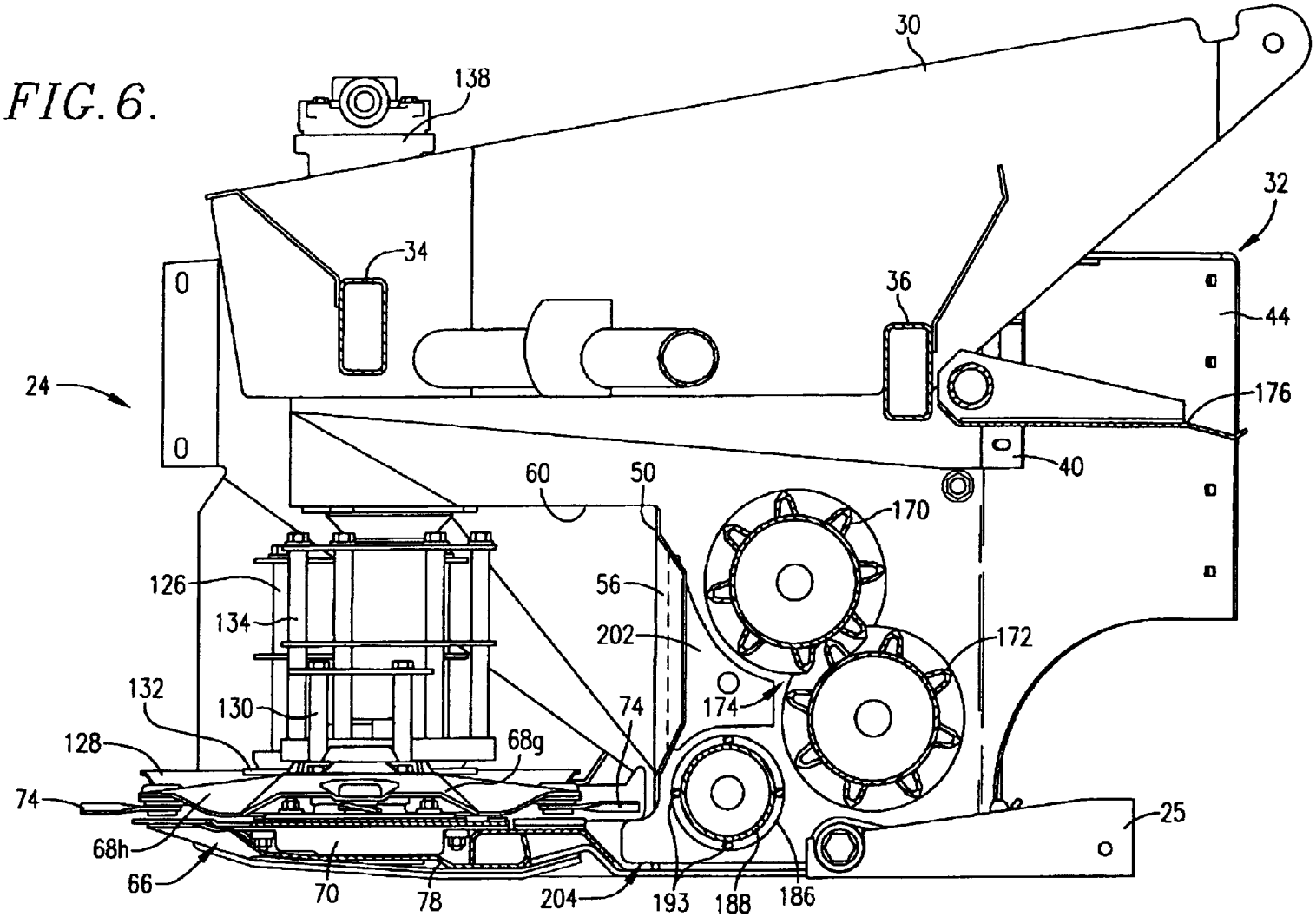
FIG. 6 is an enlarged, fragmentary vertical sectional view of the harvesting header, particularly illustrating the location of the conveying roller and the relative locations of the impeller cages.

As shown in FIG. 6, the gear case 70 is carried by a shelf-type cradle 78 that extends along the length of the header 24. The upper face of the cradle 78 is provided with a long recess or socket across the front of the machine that matingly receives the gear case 70. Front notches 80 in the leading edge of the cradle 78 (see FIGS. 4A–4B) are positioned between adjacent cutters to improve the serving action against those portions of standing crop materials located generally between adjacent cutters instead of directly in front of them.

Those ordinarily skilled in the art will appreciate that the cutting action provided by the cutter bed 66 is not necessarily consistent from one plant to another, as the machine 10 moves across the field. For example, severance of the crop may occur directly in front of one of the cutters 68a–68j or within one of the front notches 88. Nonetheless, the rotating knives 74 of the cutters 68a–68j cooperatively present a substantially planar cutting zone, within which crop is severed from the ground.

It will be noted that the cutter bed 66 projects laterally outwardly beyond both ends of the discharge opening 52 to present left and light outboard cutter sections comprising cutters 68a,68b and 68i,68j, respectively. The spur gears in the case 70 are intermeshed in such a manner that the cutters 68a,68b and 68i,68j of each outboard section rotate in the same direction, as indicated by the arrows in FIG. 3. It will also be appreciated that the spur gears are arranged in such a manner that the inner cutters 68b–68i (excluding the outermost cutters 68a and 69j) are divided into cooperating pairs, with the two cutters of each pair rotating in opposite directions. In other words, the cutters 68b and 68c rotate toward one another across the front of the cutter bed 66, as do the cutters 68d and 68e, the cutters 68f and 68g, and the cutters 68h and 68i. The illustrated cutter bed 66 is of the same general arrangement as that disclosed in U.S. Pat. No. 5,463,852, entitled WIDE CUT HARVESTER HAVING ROTARY CUTTER BED, issued Nov. 7, 1995, assigned of record to the assignee of the present invention, which is hereby incorporated by reference herein as is necessary for a full and complete understanding of the present invention. However, it will be apparent that the illustrated cutter bed 66 has several unique features which are not disclosed in the '852 parent, as will subsequently be described.

Each of the outboard cutter sections 68a,68b and 68i,68j is associated with an improved overhead crop conveying assembly for facilitating movement of crop cut by the outboard cutter section inwardly and rearwardly to the discharge opening 52. Turning initially to the left outboard cutter section (see FIGS. 4B and 5B), an impeller cage 82 is fixed to the outermost cutter 68a for rotational movement therewith about a common axis. The impeller cage 82 is of the same general construction as the impeller cages disclosed in U.S. Pat. No. 5,421,45, entitled CUT CROP IMPELLER CAGE FOR ROTARY TYPE CUTTER BEDS, issued Jun. 6, 1995, assigned of record to the assignee of the present invention, which is hereby incorporated by reference herein as is necessary for a full and complete understanding of the present invention. It will be noted that a crop lifter 84 is fixed between the metal knife carrier of the outer cutter 68a and the impeller cage 82. As perhaps best shown in FIG. 10, the lifter 84 has a generally elliptical shape and is divided into two halves 84a and 84b. The lifter 84 is provided with slotted openings 86 and 88 extending inwardly from opposite ends thereof. The openings 86,88 facilitate knife replacement by providing access to the underlying knife mounting structure. As perhaps best shown in FIG. 5B, the lifter 84 provides the cutter 68a with a relatively greater profile than that provided only by the knife carrier 72. It will be appreciated that this serves to elevate crop cut by the cutter 68a up over the adjacent, inwardly spaced cutter 68b and into engagement with the overhead crop conveying structure.

An impeller cage 90 is similarly mounted to the cutter 68b for rotational movement therewith about a common axis. However, the impeller cage 90 is relatively shorter and smaller in overall diameter than the cage 82. In particular, the impeller cage 90 includes only one level of spacers 92 secured between an upper disk 94 and a lower impeller plate 96. The impeller plate is of the same construction as that disclosed in U.S. Pat. No. 5,345,752 entitled IMPELLER PLATES FOR ROTARY CUTTING UNITS OF A CROP HARVESTER, issued Sep. 13, 1994, assigned of record to the assignee of the present invention, which is hereby incorporated by reference herein as is necessary for a full and complete understanding of the present invention. It will be appreciated that the overall diameter of the impeller cage 90 is a dimension defined by each pair of spacers spaced in radially opposite directions from the rotational axis of the cage 90. Because the impeller cages 82 and 90 are rotatable about axis spaced along the same transverse axis, the front boundary of the inner cage 90 is spaced rearwardly from the front boundary of the outer cage 82.

An intermediate impeller cage 98 is located between the outer and inner cages 82 and 90 and is suspended from the partition wall 58. As perhaps best shown in FIG. 9, the intermediate impeller cage 98 includes a mounting plate 99 fastened to the underside of the partition wall 58 and a center tubular support 100 fixed to the mounting plate 99. The attachment of the support 100 to the plate 99 is strengthened by a frusto-conically shaped brace 101. A shaft 102 is journaled for rotational movement within the stationary support 100 by a pair of upper and lower bearing assemblies 104 and 106. Fixed to the lower end of the rotatable shaft 102 is a circular plate 108. A set of six cylindrical spacers 110 is fixed between the plate 108 and an intermediate, annular-shaped disk 112, while a second set of six cylindrical spacers 114 is fixed between the intermediate disk 112 and an upwardly spaced, annular-shaped upper disk 116. The spacers 110,114 and disks 112,116 are secured in the illustrated configuration by bolts 118 threaded into the plate 108. A relatively thin, circular cover 120 projects outwardly from the support 100 just above the disk 116 to overlie the open space defined between the support 100 and disk 116. This reduces the risk of crop and debris accumulation between the support 100 and disk 116. For purposes which will subsequently be described, a double-belt sheave 122 is secured to the upper end of the shaft 102, with removal of the sheave 122 from the shaft 102 being prevented by a bolt and washer assembly 124 threadably coupled to the upper end of the shaft 102.

Figure 4B:
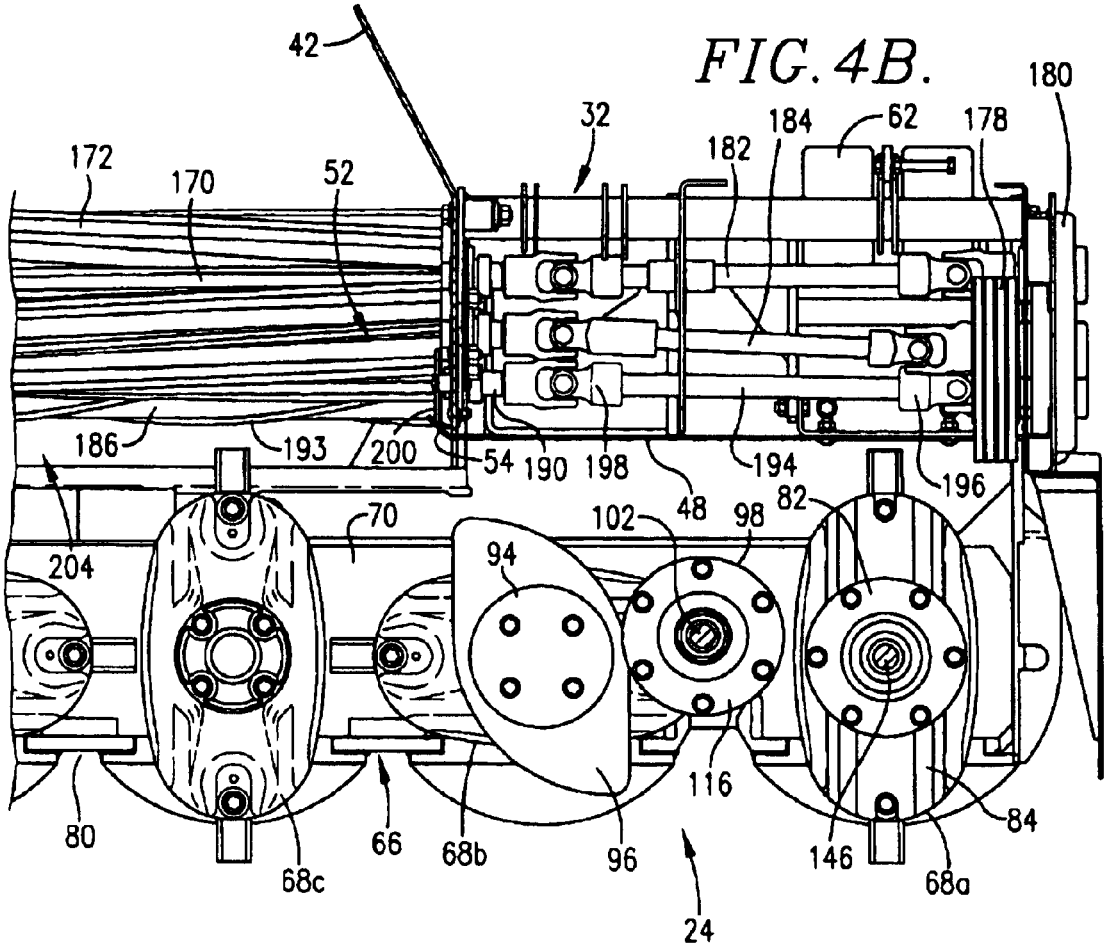
FIG. 4B is an enlarged, fragmentary top plan view of the left side of the harvesting header, particularly illustrating the three leftwardmost cutters.

The impeller cage 98 rotates about an axis defined by the upright shaft 102, with the spacers 110,114 and disks 112, 116 moving through a circular path as the shaft rotates. As perhaps best shown in FIG. 5B, the intermediate impeller cage 98 has generally the same height and overall diameter as the outer impeller cage 82. However, as shown in FIG. 4B, the rotational axis of the intermediate cage 98 is not located along the same transverse axis as the rotational axes of the outer and inner cages 82 and 90, but rather is spaced slightly behind such transverse axis. Accordingly, the front boundary of the intermediate cage 98 is spaced rearwardly from the front boundary of the outer cage 82, however forwardly from the front boundary of the relatively smaller inner cage 90. As will subsequently be described, the intermediate impeller cage 98 is driven in the same rotational direction as the outer and inner cages 82,90.

It is believed that the illustrated arrangement of the cages 82,90,98 facilitates flow of crop materials cut outboard of the left end of the discharge opening 52. In particular, crop material engaged by the outer cage 82 is moved laterally inwardly across the front of the header and then passed slightly rearwardly to the intermediate cage 98. The intermediate cage 98 likewise conveys the crop material inwardly across the front of the header and rearwardly to the inner cage 90. The inner cage 90 in turn moves the crop material inwardly across the front of the header and then rearwardly to the discharge opening 52. Thus, the cages 82,98,90 cooperatively impart a rearwardly and inwardly directed converging influence on the cut crop as a result of the lateral and progressively rearward spacing of the cages. As previously noted, the lifter 84 associated with the outer cutter 68a serves to lift crop above the adjacent, inwardly spaced cutter 68b and into engagement with the cages 82,98,90. This prevents crop cut by the outer cutter 68a from being further shredded/comminuted by the adjacent, inwardly spaced cutter 68b.

The right outward cutter section (see FIGS. 4A and 5A) is similarly associated with an overhead conveying assembly for facilitating movement of crop cut by the outboard section inwardly and rearwardly to the discharge opening 52. The overhead conveying assembly for the right outboard cutter section is similar in construction to the overhead conveying assembly previously described for the left outboard cutter section. Thus, it shall be sufficient to explain that the right overhead conveying assembly includes an impeller cage 126 fixed to the outer cutter 68j, with a crop lifter 128 being positioned between the impeller cage 126 and knife carrier of the cutter 68j for rotational movement therewith. A relatively smaller impeller cage 130 is fixed to the adjacent, inwardly spaced cutter 68j, along with an impeller plate 132. An intermediate impeller cage 134 is suspended from the partition wall 60 between the outer and inner cages 126,130. The progressively rearward spacing of the front boundaries of the impeller cages 126,134,130 is perhaps best shown i FIG. 6.

Figure 5A:
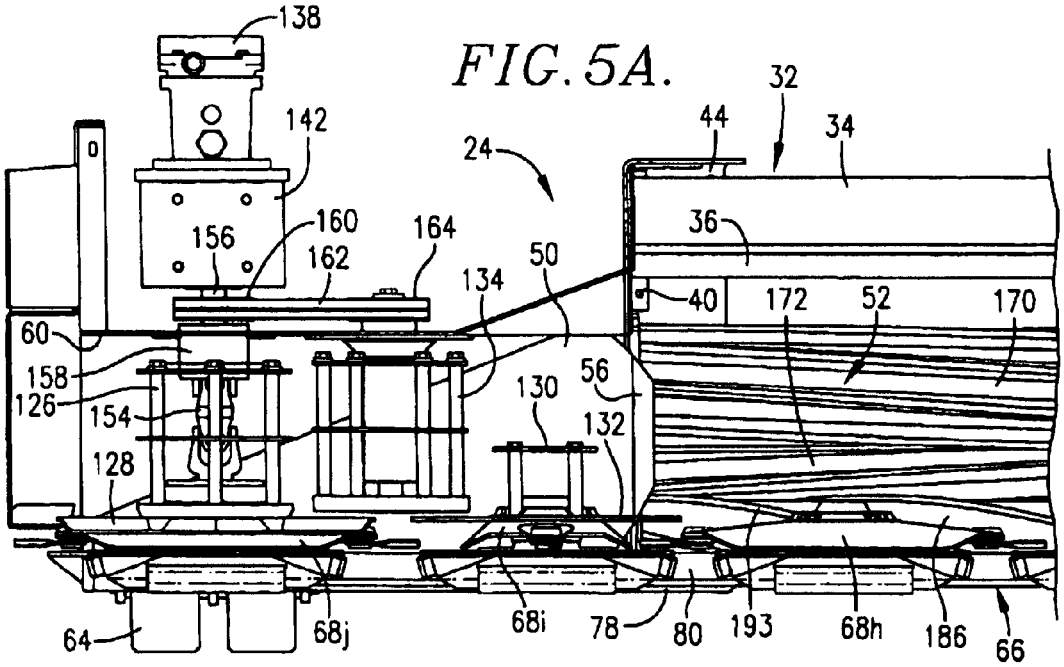
FIG. 5A is an enlarged, fragmentary front elevational view of the right side of the harvesting header, particularly illustrating the three rightwardmost cutters.

In the illustrated embodiment, driving power is provided to the various driven components of the header 24 by a pair of hydraulic motors 136 and 138. As perhaps best shown in FIGS. 5A and 5B, the left motor 134 is supported on a gearbox 140 mounted to a front, laterally extending plate (not shown) of the header framework 32, while the right motor 138 is supported on a drive housing 142 similarly fastened to the front plate. The left outer cutter 68a is drivingly connected to the motor 136 by a double U-joint assembly 144 contained in the impeller cage 82 and attached to the output shaft 146 of the gearbox 140 within a sleeve 148 fixed to the partition wall 58 (see FIG. 5B). It will be noted that the output shaft 146 carries a double-belt sheave 150, with a pair of belts 152 entraining the sheaves 122,150 to drive the intermediate impeller cage 98 in the same direction as the outer cutter 68a and associated impeller cage 82. As shown in FIG. 5A, the right outer cutter 68j is similarly connected to the motor 138 by a double U-joint assembly 154 contained within the impeller cage 126 and attached to the output shaft 156 of the drive housing 142 within a sleeve 158 fixed to the partition wall 60. The output shaft 156 likewise carries a double-belt sheave 160 entrained by a pair of belts 162. The belts 162 wrap around the driven sheave 164 fixed to the intermediate impeller cage 134 so as to drive the cage 134 in the same direction as the outer cutter 68j and the associated impeller cage 126.

With the end cutters 68a and 68j being drivingly connected to the remaining cutters 68b and 68i via the spur gears in the gear case 70, driving power is supplied to the entire cutter bed 66 by the hydraulic motors 134,136. As shown in FIG. 1, the hydraulic motors 134 and 136 are connected to the hydraulic drive and control circuit (not shown) of the mower/conditioner by respective conduits 166 and 168. In the usual manner, each conduit includes a supply line and a return line. Preferably, the hydraulic motors 134,136 are fluidly intercommunicated so as to share the load of driving the cutters 68a–68j. In addition, the preferred hydraulic drive and control circuit is designed to drive the cutter bed 66 in such a manner that the speed of the cutters 68a–68j remain substantially constant even if the speed of the engine (not shown) driving the hydraulic pump (also not shown) for the bed 66 lugs down such as when heavy crop conditions are encountered. Such an arrangement is disclosed in U.S. Pat. No. 5,430,997, entitled HARVESTER WITH HYDRAULICALLY DRIVEN, FLOW-COMPENSATED ROTARY CUTTER BED, issued Jul. 11, 1995, assigned of record to the assignee of the present invention, which is hereby incorporated by reference herein as is necessary for a full and complete understanding of the present invention.

Figure 2:
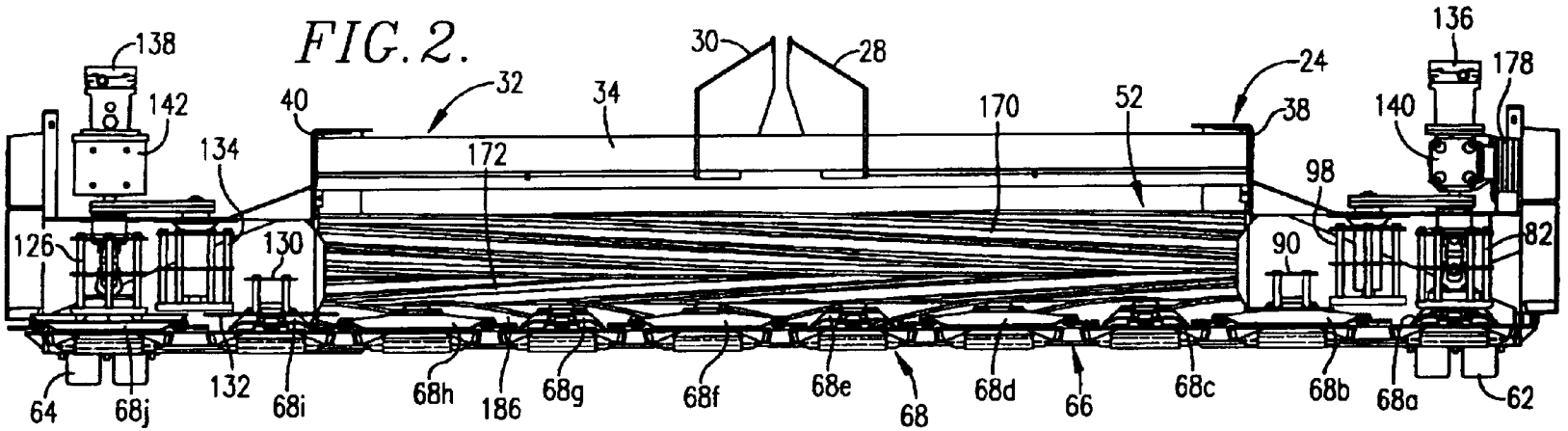
FIG. 2 is an enlarged front elevational view of the harvesting header shown in FIG. 1, with parts being broken away to illustrate the cutter bed, the crop conditioning rolls, the crop conveying roller, and the impeller cages for facilitating crop flow from the outboard cutters to the conditioning rolls.
Figure 4A:
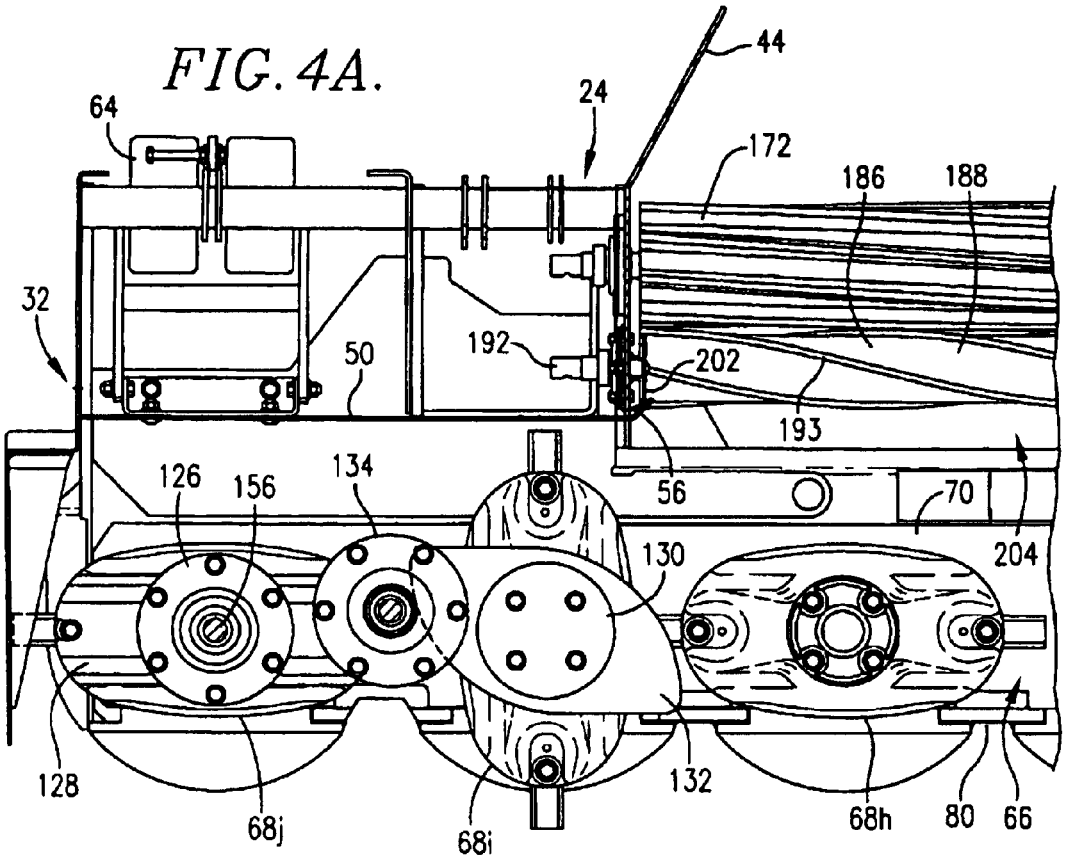
FIG. 4A is an enlarged, fragmentary top plan view of the right side of the harvesting header, particularly illustrating the three rightwardmost cutters.

As perhaps best shown in FIGS. 2 and 3, a pair of laterally extending crop conditioning rolls 170 and 172 are rotatably mounted on the supports 42 and 44 to span the discharge opening 52. In the illustrated embodiment, the conditioning rolls 170,172 comprise cylindrical metal bodies having intermeshing helical, metal ribs extending along the length of the bodies, although other conditioning roll designs (e.g., rubber-coated rolls) may be utilized. The conditioning rolls 170,172 are arranged in a stacked relationship for rotation about respective, vertically spaced transverse axes, with the upper roll 170 being driven in a counterclockwise direction and the lower roll 172 being driven in a clockwise direction, as indicated by the arrows in FIG. 6. In addition, the rolls 170,172 are yieldably biased toward one another to prevent a bitting nip 174 therebetween that receives cut crop from the cutter bed 66 and propels the same rearwardly toward the windrow forming shields 46. The nip 174 is spaced upwardly and rearwardly from the cutter bed 66. It may also be said that the nip 174 is spaced upwardly and rearwardly from the generally planar cutting zone defined by the knives 74 of the rotary cutters 68a–68j.

An adjustable swath board 176 is swingably mounted between the side plates 38,40 for permitting the operator to control the direction of crop material discharged by the conditioning rolls 170,172. In the illustrated orientation, the swath board 176 has a negligible effect on crop flow from the conditioning rolls 170 and 172, such that the crop is formed into a windrow by the forming shields 46. However, if the swath board 176 is swung to a generally vertical orientation (not shown), the conditioned crop is directed immediately down to the ground without being guided by the forming shields 46 so as to form a wide swath.

Figure 5B:
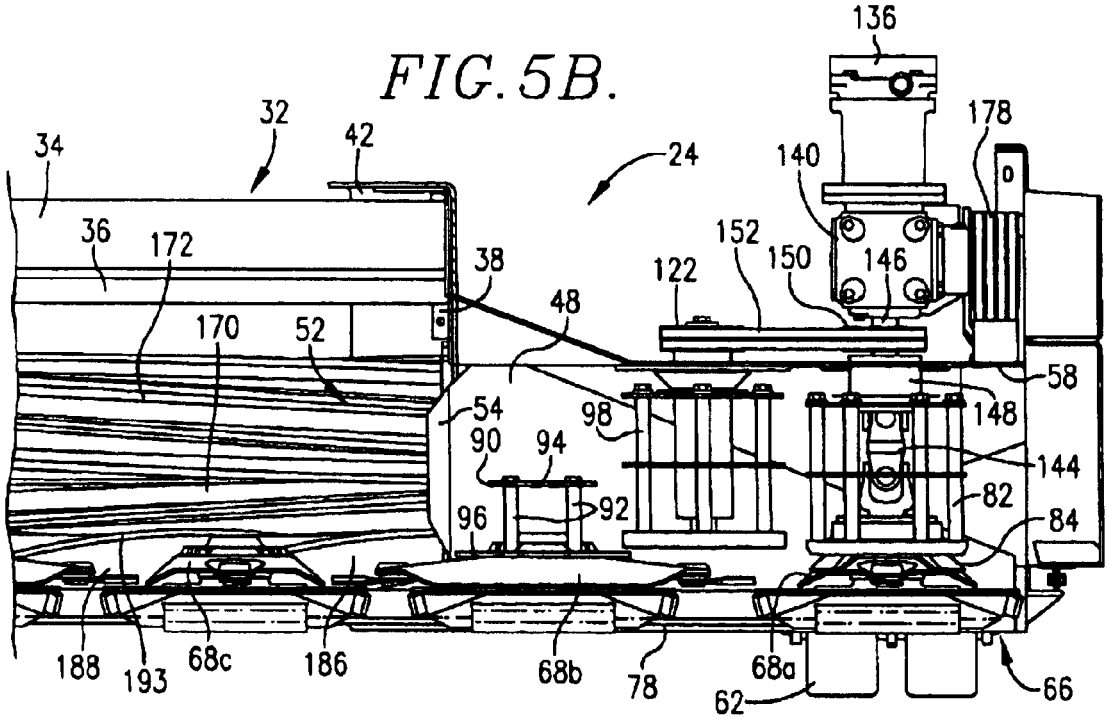
FIG. 5B is an enlarged, fragmentary front elevational view of the left side of the harvesting header, particularly illustrating the three leftwardmost cutters.

As shown in FIGS. 4B and 5B, a belt and sheave drive 178 is connected between the horizontal output shaft (not shown) of the gearbox 140 and a spur gear transmission (also not shown) contained with an upright case 180. In the usual manner, the conditioning rolls 170 and 172 are drivingly connected to the transmission by respective drive shafts 182 and 184, each of which has U-joint assemblies at opposite ends thereof. The illustrated drive shaft 182 for the upper conditioning roll 170 is actually connected to the driven sheave (not shown) of the belt and sheave drive 178. Accordingly, because the motors 136,138 share the load of powering the header components, as previously noted, the conditioning rolls 170,172 are driven by both motors 136, 138.

As previously indicated, one problem often associated with conventional mower/conditioner designs is impeded or uneven crop flow from the cutter to the conditioning rolls. The present invention specifically addresses this problem by providing structure for ensuring smooth, even crop flow from the cutter bed 66 to the upwardly and rearwardly spaced nip 174 defined between the conditioning rolls 170, 172. In addition, the crop conditioning rolls 170,172 have been moved rearwardly with respect to their traditional location relative to the cutter, as will subsequently be described.

Turning first to the crop conveying structure, the illustrated embodiment includes a laterally extending, rotatable roller 186 located generally between the cutter bed 66 and the lower conditioning roll 172. The illustrated conveying roller 186 comprises a tubular, cylindrically-shaped body 188 carried by a pair of stub shafts 190 and 192 (see FIGS. 4A and 4B) projecting from the ends of the body 188. As perhaps best shown in FIGS. 3 and 6, the conveying roller 186 includes four helical ribs 193, each extending along the length of the body 188 and having opposite inclination on either side of the midpoint of the roller 186. In the illustrated embodiment, the body 188 and ribs 193 are formed of metal, and the ribs 193 comprise cylindrical rods welded to the body 188, although other suitable materials and means for attaching the ribs 193 to the body 188 may be utilized. The ribs 193 enhance the aggressiveness of the roller periphery to further influence movement of crop material between the cutter bed 66 and the nip 174.

Similar to the conditioning rolls 170 and 172, the stub shafts 190 and 192 are journaled for rotational movement on the supports 42 and 44 by suitable bearing assemblies. Additionally, the conveying roller is drivingly connected to the spur gear transmission housed within the case 180 by a drive shaft 194 (see particularly FIG. 4B). The drive shaft includes U-joint assemblies 196 and 198 at its opposite ends, with the outer U-joint assembly 196 being connected to an output shaft (not shown) of the transmission housed within the case 180, and the inner U-joint assembly 198 being connected to the stub shaft 190. In this respect, the conveying roller 186 is driven in a clockwise direction, when viewing FIG. 6, about a rotational axis defined by the stub shafts 190,192. As perhaps best shown in FIGS. 4A–4B and 6, guide plates 200 and 202 are secured to the supports 40 and 42 to project rearwardly from the flanges 54 and 56, respectively. The guide plates 200 and 202 are located generally between the conveying roller 186 and the upper conditioning roll 170 and are spaced from the respective supports 40 and 42. The plates 200 and 202 guide crop rearwardly from the cutter bed 66 to the conditioning rolls 170,172 and reduce the risk of crop material and trash accumulation at the ends of the roll 186.

As perhaps best shown in FIG. 6, the conveying roller 186 presents a diameter that is less than the diameter of each of the conditioning rolls 170 and 172. In addition, the conveying roller 186 is located within the header 24 to span the discharge opening 52 between the cutter bed 66 and the lower conditioning roll 172. That is to say, the conveying roller 186 has substantially the same length as the conditioning rolls 170,172. The rotational axis of the conveying roller 186 is spaced below the rotational axis of the lower conditioning roll 172 and is generally vertically aligned with the planar cutting zone defined by the knives 74. Thus, the upper front quadrant of the conveying roller 186 presents an upwardly and rearwardly moving surface extending between the cutter bed 66 and the nip 174.

Figure 7:
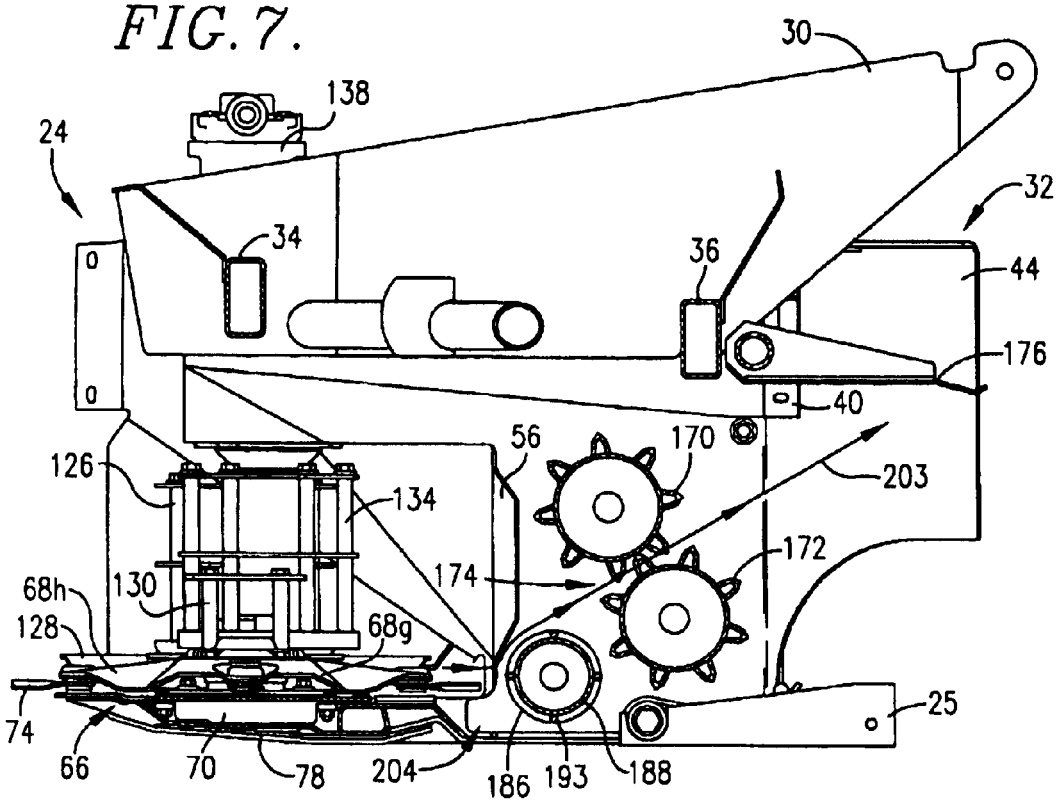
FIG. 7 is a fragmentary vertical sectional view of the harvesting header similar to FIG. 6, but further illustrating the crop path through the header.

As shown in FIG. 7, crop material thrown rearwardly by the cutter bed 66 first encounters the conveying roller 186, which in turn lifts the crop material upwardly and rearwardly to the nip 174 defined between the conditioning rolls 170, 172. In moving along the path represented by the arrows 203, the crop material is not required to turn sharp angles, but rather rises gently and gradually from the cutter bed 66 to the nip 174. That is to say, the relatively small and low conveying roller 186 "helps" the crop material move up and through the conditioning rolls 170,172. It is noted that a downwardly open area 204 (see FIGS. 3, 4A–4B, 6 and 7) is defined between the cutter bed 66 and the conveying roller 186, although a transverse pan (not shown) extending between the cutter bed 66 and the conveying roller 186 may be placed in the area 204, if desired. The open area 204 prevents crop material and debris from accumulating between these two components and, in fact, permits any trash and debris moving along the path 203 to drop from the header 24. It will also be noted that the crop material conveyed inwardly by the impeller cages 82,90,98 and 126,130, 134 probably passes through the discharge opening 52 above the conveying roller 186 and directly into contact with the upper conditioning roll 170, although any such crop material engaging the conveying roller 186 will be moved along the illustrated path 203.

Figure 8:
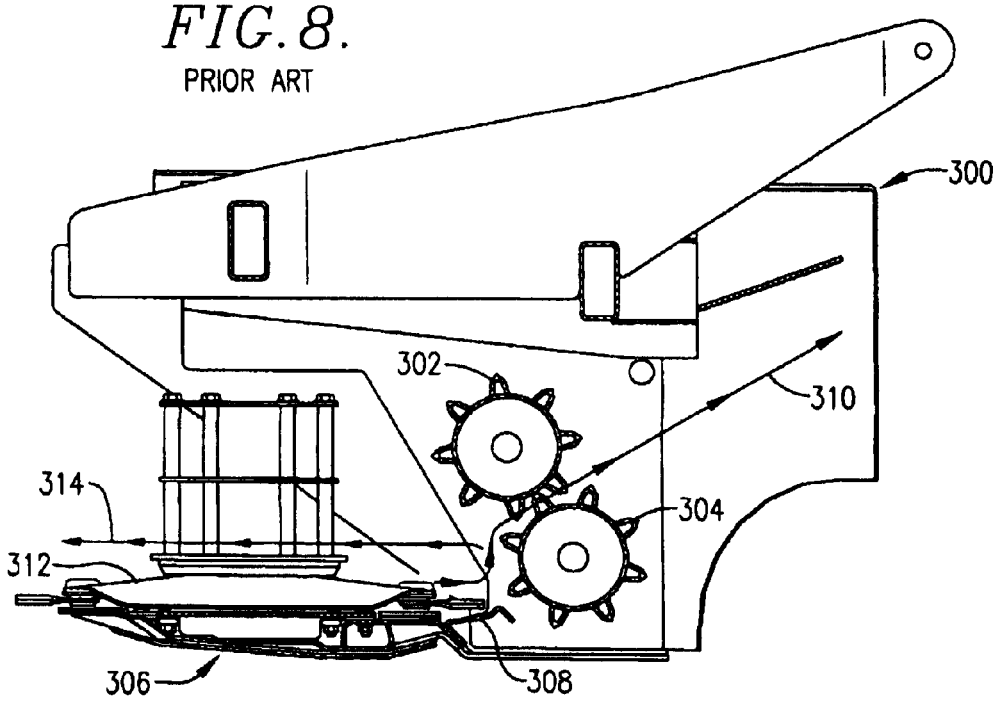
FIG. 8. PRIOR ART
FIG. 8 is a fragmentary, vertical sectional view of a prior art harvesting header, particularly illustrating what is believed to be the crop path through the header and the tendency of rejected crop material to be thrown forwardly by the cutters.

The present invention eliminates the problem in the prior art of impeded or uneven crop flow between the cutter bed and conditioning rolls as illustrated in FIG. 8. A conventional mower/conditioner header 300 is shown in FIG. 8 as including a pair of crop conditioning rolls 302 and 304 located just behind the cutter bed 306. The illustrated prior art header 300 further includes a slightly upwardly and rearwardly inclined baffle 308 between the cutter bed 306 and conditioning rolls 302,304. The baffle 308 has a tendency to collect crop material and debris thereon. In addition, it is believed that the baffle 308 provides little, if any, assistance to crop flow between the cutter bed 306 and the conditioning rolls 302,304. It is also believed that crop material moving from the cutter bed 306 through the conditioning rolls 302, 304 must travel along the path represented by the arrows 310. Thus, the crop material must turn virtually a ninety degree angle to move up along the lower conditioning roll 304 and then turn again rearwardly to pass through the conditioning rolls 302,304. In this respect, the lower conditioning roll 304 is essentially an obstruction to crop flow through the header 300, and any crop that is "rejected" by the lower conditioning roll 304 is likely to be thrown forwardly by the rotary cutters 312. Such a rejected path of travel is represented by the arrows 314. Of course, any material moving along the path 314 has a tendency to be recycled through the header 300 and will consequently be overly shredded by the cutter bed 306. In addition, crop material thrown forwardly along the path 314 is likely to knock over standing crop, which is detrimental to the cutting action of the rotary cutters 312.

In contrasting FIGS. 7 and 8, it is apparent that the conditioning rolls 170,172 have been moved rearwardly in the header 24 relative to the cutter bed 66 in comparison to the location of the conditioning rolls 302,304 in the prior art header 300. This not only accommodates the conveying roller 186, but also provides a funneling effect as the crop material moves through the discharge opening 52 to the conditioning rolls 170,172. It is believed that the funneling effect further facilitates crop flow through the header 24.

It is also noted that the principles of the present invention are equally applicable to various other structure for conveying crop from the cutter bed 66 to the conditioning rolls 170,172. For example, the header 24 may be provided with a rubber-coated roller (not shown) having a textured outer surface that enhances the feeding action of the roller. The conveying element may alternatively be constructed in a manner similar to the illustrated impeller cages, with a generally open configuration including a plurality of longitudinally extending, spaced apart spacers located about the periphery of the conveying element. It is also entirely within the ambit of the present invention to utilize an endless conveying element, such as a belt, having a stretch that moves upwardly and rearwardly between the cutter bed 66 and the nip 174.

The operation of the machine should be apparent from the foregoing description. Thus, it shall be sufficient to explain that the cutter bed 66 serves crop the ground as the harvester 10 moves across a field. The cut crop thrown rearwardly by the cutter bed 66 engages the upper front quadrant of the conveying roller 186 and is thereby lifted gradually toward the nip 174 defined between the conditioning rolls 170,172. The impeller cages 82,90,98 and 126,130,134 cooperatively converge crop material cut by the outboard cutters 68a,68b and 68i,68j inwardly and rearwardly through the discharge opening 52. Such converged crop is probably directed to the upper conditioning roll 170, although any converged crop engaging the conveying roller 186 will be moved along the path 203. Conditioned crop material is discharged rearwardly by the rolls 170,172 and directed into a windrow or wide swath depending upon the orientation of the swatch board 176.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention. For example, the principles of the present invention are equally applicable to other variously constructed crop cutting assemblies. If desired, the cutting assembly may comprise a pair of large rotating discs rather than the illustrated series of cutters. It is also not necessary to drivingly connect the cutters to one another through a common gear case, The cutters may also be independently supported and driven.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A crop harvesting header configured for attachment to the mobile frame of a harvesting machine, said header comprising:

a crop cutting assembly comprising a series of rotary cutters that are rotatable about individual, upright axes and *have knives* that cooperatively define a laterally extending *generally planar* cutting zone along which crop material is severed from the ground by the cutting assembly;

a pair of laterally extending crop conditioning rolls cooperatively defining a nip therebetween that is spaced upwardly and rearwardly from the cutting zone,[; and]

*said pair of conditioning rolls including a lower conditioning roll having a lower, forward peripheral portion that moves forwardly and upwardly generally toward the rotary cutters during rotation of the lower conditioning roll; and* a driveable crop conveying element having at least a portion thereof that moves upwardly and rearwardly between the cutting zone and the nip to convey crop cut by the cutting assembly toward the nip when the element is driven,

*said conveying element comprising a laterally extending, rotatable conveying roller having an upper forward peripheral portion that moves rearwardly and upwardly generally away from the rotary cutters during rotation of the conveying roller and a lower, forward peripheral portion that moves forwardly and upwardly generally toward the rotary cutters during rotation of the conveying roller,*

*said upper forward peripheral portion of the conveying roller being disposed in front of the lower forward peripheral portion of the lower conditioning roll, and most of the lower, forward peripheral portion of the conveying roller being disposed below the plane of said cutting zone.*

2. A crop harvesting header as claimed in claim 1;

header framework defining a laterally extending discharge opening spaced rearwardly from the cutting zone, with the opening being configured to receive cut crop from the series of cutters, said cutting assembly projecting beyond the ends of the discharge opening to present a pair of outboard cutter sections; and a pair of crop conveying assemblies, each disposed over a respective one of the outboard cutter sections for conveying crop cut by the respective one of the outboard cutter sections rearwardly and inwardly to the discharge opening.

3. A crop harvesting header as claimed in claim 2, each of said crop conveying assemblies including a plurality of laterally spaced impeller [cages] *devices* rotatable about individual, upright axes, each of said impeller [cages] *devices* presenting a front moveable boundary that is spaced forwardly of the adjacent inwardly spaced impeller [cage] *device*.

4. A crop harvesting header as claimed in claim 3, each outboard cutter section including a first cutter and an inwardly spaced second cutter, said plurality of impeller [cages] *devices* including a first impeller [cage] *device* mounted to the first cutter for rotational movement therewith, a second impeller [cage] *device* mounted to the second cutter for rotational movement therewith, and an intermediate impeller [cage] *device* suspended from the header framework between the first and second impeller [cages] *devices*.

5. A crop harvesting header as claimed in claim 1,

[said crop cutting assembly and said conveying element defining a downwardly open area therebetween.]

*said conveying roller having an outermost diameter that is smaller than the outermost diameter of the lower conditioning roll.*

6. A crop harvesting header as claimed in claim [1] *4*,

[said conveying element comprising a laterally extending, rotatable conveying roller having an outer periphery defining the upwardly and rearwardly moveable portion of the conveying element]

*each of said impeller devices comprising a cage.*

7. A crop harvesting header as claimed in claim [6] *1*,

[said conveying roller and said cutting assembly presenting a downwardly open area therebetween.]

*said conveying roller comprising a single roller, unaccompanied by an upper roller forming a nip therewith.*

8. A crop harvesting header as claimed in claim [6] *1*,

[said conveying roller including at least one helical rib extending along the roller periphery and having opposite inclination on either side of the midpoint of the conveying roller.]

*said series of cutters including multiple pairs of oppositely rotating cutters.*

[9. A crop harvesting header as claimed in claim 6, said conveying roller having a relatively smaller diameter than the conditioning rolls.]

[10. A crop harvesting header as claimed in claim 9, said conditioning rolls being in a stacked relationship to present an upper conditioning roll and a lower conditioning roll;

said lower conditioning roll being rotatable about a lower conditioning roll axis, said conveying roller being rotatable about a conveying roller axis that is lower than the lower conditioning roll axis.]

11. A crop harvesting header as claimed in claim [10] *1*, said [cutting zone being substantially planar and generally vertically aligned with the conveying roller axis] *conveying roller being rotatable about a conveying roller axis that is generally vertically aligned with the plane of said cutting zone.*

12. In a crop harvesting machine having a mobile frame, the improvement comprising:

a crop cutting assembly comprising a series of rotary cutters that are rotatable about individual, upright axes and

*have knives* that cooperatively define a laterally extending *generally planar* cutting zone along which crop material is severed from the ground by the cutting assembly;

a pair of laterally extending crop conditioning rolls cooperatively defining a nip therebetween that is spaced upwardly and rearwardly from the cutting zone[; and],

*said pair of conditioning rolls including a lower conditioning roll having a lower, forward peripheral portion that moves forwardly and upwardly generally toward the rotary cutters during rotation of the lower conditioning roll; and* a driveable crop conveying element having at least a portion thereof that moves upwardly and rearwardly between the cutting [Zone] *zone* and the nip to convey crop cut by the cutting assembly toward the nip when the element is driven,

*said conveying element comprising a laterally extending, rotatable conveying roller having an upper forward peripheral portion that moves rearwardly and upwardly generally away from the rotary cutters during rotation of the conveying roller and a lower, forward peripheral portion that moves forwardly and upwardly generally toward the rotary cutters during rotation of the conveying roller,*

*said upper forward peripheral portion of the conveying roller being disposed in front of the lower forward peripheral portion of the lower conditioning roll, and most of the lower, forward peripheral portion of the conveying roller being disposed below the plane of said cutting zone.*

13. In a crop harvesting machine as claimed in claim 12, framework defining a laterally extending discharge opening spaced rearwardly from the cutting zone, with the opening being configured to receive cut crop from the series of cutters, said cutting assembly projecting beyond the ends of the discharge opening to present a pair of outboard cutter sections; and a pair of crop conveying assemblies, each disposed over a respective one of the outboard cutter sections for conveying crop cut by the respective one of the outboard cutter sections respectively inwardly to the discharge opening.

14. In a crop harvesting machine as claimed in claim 13, each of said crop conveying assemblies including a plurality of laterally spaced impeller [cages] *devices* rotatable about individual, upright axes, each of said impeller [cages] *devices* presenting a front moveable boundary that is spaced forwardly of the adjacent inwardly spaced impeller [cage] *device*.

15. In a crop harvesting machine as claimed in claim 14, each outboard cutter section including a first cutter and an inwardly spaced second cutter, said plurality of impeller [cages] *devices* including a first impeller [cage] *device* mounted to the first cutter for rotational movement therewith, a second impeller [cage] *device* mounted to the second cutter for rotational movement therewith, and an intermediate impeller [cage] *device* suspended from the framework between the first and second impeller [cages] *devices*.

16. In a crop harvesting machine as claimed in claim 12,

[said crop cutting assembly and said conveying element defining a downwardly open area therebetween.]

*said conveying roller having an outermost diameter that is smaller than the outermost diameter of the lower conditioning roll.*

17. In a crop harvesting machine as claimed in claim [12] *14*,

[said conveying element comprising a laterally extending, rotatable conveying roller having an outer periphery defining the upwardly and rearwardly moveable portion of the conveying element.]

*each of said impeller devices comprising a cage.*

18. In a crop harvesting machine as claimed in claim [17] *12*,

[said conveying roller and said cutting assembly presenting a downwardly open area therebetween.]

*said conveying roller comprising a single roller, unaccompanied by an upper roller forming a nip therewith.*

19. In a crop harvesting machine as claimed in claim [17] *12*,

[said conveying roller including at least one helical rib extending along the roller periphery and having opposite inclination on either side of the midpoint of the conveying roller.]

*said series of cutters including multiple pairs of oppositely rotating cutters.*

[20. In a crop harvesting machine as claimed in claim 17, said conveying roller having a relatively smaller diameter than the conditioning rolls.]

[21. In a crop harvesting machine as claimed in claim 20, said conditioning rolls being in a stacked relationship to present an upper conditioning roll and a lower conditioning roll, said lower conditioning roll being rotatable about a lower conditioning roll axis, said conveying roller being rotatable about a conveying roller axis that is lower than the lower conditioning roll axis.]

[22. In a crop harvesting machine as claimed in claim 21, said zone being substantially planar and generally vertically aligned with the conveying roller axis.]

23. A crop harvesting machine comprising:

a mobile frame; and a harvesting header supported on the frame for harvesting crop as the frame moves across a field, said header including a cutter bed extending across the path of travel of the frame and including a series of rotary cutters *that are* rotatable about individual, upright axes *and that have knives that cooperatively define a laterally extending generally planar cutting zone along which crop material is severed from the ground by the cutter bed*, header framework defining a laterally extending discharge opening spaced rearwardly from the cutter bed, with the opening being configured to receive cut crop from the series of cutters, a pair of crop conditioning rolls spanning the discharge opening and defining a nip therebetween that is spaced upwardly and rearwardly from the other bed, [and]

*said pair of conditioning rolls including a lower conditioning roll having a lower, forward peripheral portion that moves forwardly and upwardly generally toward the rotary cutters during rotation of the lower conditioning roll, and* a laterally extending crop conveying roller located between the cutter bed and the nip, said conveying roller being rotatable in a direction to move crop from the cutter bed toward the nip,

*said conveying roller having an upper forward peripheral portion that moves rearwardly and upwardly generally*

*away from the rotary cutters during rotation of the conveying roller and a lower, forward peripheral portion that moves forwardly and upwardly generally toward the rotary cutters during rotation of the conveying roller,*

*said upper forward peripheral portion of the conveying roller being disposed in front of the lower forward peripheral portion of the lower conditioning roll, and most of the lower, forward peripheral portion of the conveying roller being disposed below the plane of said cutting zone.*

24. A crop harvesting machine as claimed in claim 23, said frame carrying a power source for propelling the frame across the field.

25. A crop harvesting machine as claimed in claim 23, said series of rotary cutters including two sets of outboard cutters, with each of the sets being located adjacent an end of the cutter bed and substantially outboard of the discharge opening; and a pair of crop conveying assemblies, each disposed over a respective one of the sets of outboard cutters for conveying crop cut by the respective one of the sets of outboard cutters rearwardly and inwardly to the discharge opening.

26. A crop harvesting machine as claimed in claim 25, each of said crop conveying assemblies including a plurality of laterally spaced impeller [cages] *devices* rotatable about individual, upright axes, each of said impeller [cages] *devices* presenting a front moveable boundary that is spaced forwardly of the adjacent inwardly spaced impeller [cage] *device*.

27. A crop harvesting machine as claimed in claim 26, each set of outboard cutters including a first cutter and an inwardly spaced second cutter, said plurality of impeller [cages] *devices* including a first impeller [cage] *device* mounted to the first cutter for rotational movement therewith, a second impeller [cage] *device* mounted to the second cutter for rotational movement therewith, and an intermediate impeller [cage] *device* suspended from the framework between the first and second impeller [cages] *devices*.

28. A crop harvesting machine as claimed in claim [23] *27*,

[said cutter bed and said conveying roller defining a downwardly open area therebetween.]

*each of said impeller devices comprising a cage.*

29. A crop harvesting machine as claimed in claim [23] *25*,

[said conveying roller including at least one helical rib extending along the roller periphery and having opposite inclination on either side of the midpoint of the conveying roller.]

*said series of rotary cutters including multiple pairs of oppositely rotating cutters disposed in forward alignment with said discharge opening.*

30. A crop harvesting machine as claimed in claim 23, said conveying roller having [a relatively smaller diameter than the conditioning rolls.] *an outermost diameter that is smaller than the outermost diameter of the lower conditioning roll.*

31. A crop harvesting machine as claimed in claim 30,

[said conditioning rolls being in a stacked relationship to present an upper conditioning roll and a lower conditioning roll, said lower conditioning roll being rotatable about a lower conditioning roll axis,]

said conveying roller being rotatable about a conveying roller axis that is [lower than the lower conditioning roll axis.] *generally vertically aligned with the plane of said cutting zone.*

32. A crop harvesting machine as claimed in claim [31] *23*,

[said cutter bed defining a substantially planar cutting zone,]

said *conveying roller having a* conveying roller axis [being] *that is* generally vertically aligned with the *plane of the* cutting zone.

*33. A crop harvesting machine comprising:*

*a mobile frame; and*

*a harvesting header supported on the frame for harvesting crop as the frame moves across a field, said header including*

*a cutter bed extending across the path of travel of the frame and including a series of rotary cutters rotatable about individual, upright axes,*

*said cutters having knives that cooperatively define a laterally extending generally planar cutting zone along which crop material is severed from the ground by the cutter bed,*

*header framework defining a laterally extending discharge opening spaced rearwardly from the cutter bed, with the opening being configured to receive cut crop from the series of cutters,*

*a pair of transversely extending, oppositely rotating crop conditioning rolls disposed within and spanning the discharge opening and defining a nip therebetween that is spaced upwardly and rearwardly from the cutter bed,*

*said pair of conditioning rolls including a lower conditioning roll having a lower, forward peripheral portion that moves forwardly and upwardly generally toward the rotary cutters during rotation of the lower conditioning roll,*

*said discharge opening having a pair of opposite ends,*

*said series of cutters including multiple pairs of oppositely rotating cutters positioned to direct severed material into the discharge opening,*

*said cutter bed projecting laterally outwardly beyond opposite ends of the discharge opening to present two sets of outboard cutters at opposite ends of the cutter bed that are disposed outboard of the discharge opening with the outboard cutters of each set rotating in the same direction generally inwardly toward the discharge opening,*

*a pair of crop conveying assemblies at opposite ends of the cutter bed for assisting in directing crop severed by the outboard cutters laterally inwardly generally toward the discharge opening,*

*each of said crop conveying assemblies comprising a plurality of laterally spaced impeller devices disposed higher than the outboard cutters and rotatable inwardly about individual, upright axes,*

*a laterally extending crop conveying roller located between the cutter bed and the nip,*

*said conveying roller being rotatable in a direction to move crop from the cutter bed toward the nip,*

*said conveying roller being disposed within said discharge opening and spanning the same,*

*said conveying roller having an upper forward peripheral portion that moves rearwardly and upwardly generally away from the rotary cutters during rotation of the conveying roller and a lower, forward peripheral portion that moves forwardly and*

*upwardly generally toward the rotary cutters during rotation of the conveying roller,*

*said upper forward peripheral portion of the conveying roller being disposed in front of the lower forward peripheral portion of the lower conditioning roll, and most of the lower, forward peripheral portion of the conveying roller being disposed below the plane of said cutting zone.*

*34. A crop harvesting machine as claimed in claim 33,*

*said conveying roller having an outermost diameter that is smaller than the outermost diameter of the lower conditioning roll.*

*35. A crop harvesting machine as claimed in claim 33,*

*said conveying roller being rotatable about a conveying roller axis that is generally vertically aligned with the plane of said cutting zone.*

*36. A crop harvesting machine as claimed in claim 33,*

*each plurality of impeller devices including an outer impeller device having a front inwardly movable boundary and an inner impeller device having a front inwardly movable boundary,*

*the inwardly movable boundary of each outer impeller device being spaced forwardly of the inwardly movable boundary of the corresponding inner impeller device.*

*37. A crop harvesting machine as claimed in claim 36,*

*each plurality of impeller devices further including an intermediate impeller device disposed generally between said outer impeller device and said inner impeller device,*

*each intermediate impeller device having a front inwardly movable boundary,*

*the inwardly movable boundary of each outer impeller device being spaced forwardly of the inwardly movable boundary of the corresponding intermediate impeller device.*

*38. A crop harvesting machine as claimed in claim 36,*

*each set of outboard cutters including an outer cutter and an inner cutter,*

*said plurality of impeller devices including an outer impeller device rotatable about the same axis of rotation as the corresponding outer cutter and an inner impeller device rotatable about the same axis of rotation as the corresponding inner cutter.*

*39. A crop harvesting machine as claimed in claim 36,*

*at least some of said impeller devices being generally cylindrical and comprising cages having a plurality of circumferentially spaced uprights.*

*40. A crop harvesting header configured for attachment to the mobile frame of a harvesting machine, said header comprising:*

*a crop cutting assembly comprising a series of rotary cutters that are rotatable about individual, upright axes and have knives that cooperatively define a laterally extending generally planar cutting zone along which crop material is severed from the ground by the cutting assembly;*

*a pair of laterally extending crop conditioning rolls cooperatively defining a nip therebetween that is spaced upwardly and rearwardly from the cutting zone,*

*said pair of conditioning rolls including a lower conditioning roll having a lower, forward peripheral portion that moves forwardly and upwardly generally toward the rotary cutters during rotation of the lower conditioning roll; and*

*a driveable crop conveying element having at least a portion thereof that moves upwardly and rearwardly between the cutting zone and the nip to convey crop cut by the cutting assembly toward the nip when the element is driven,*

*said conveying element comprising a laterally extending, rotatable conveying roller having an upper forward peripheral portion that moves rearwardly and upwardly generally away from the rotary cutters during rotation of the conveying roller,*

*said upper forward peripheral portion of the conveying roller being disposed in front of the lower forward peripheral portion of the lower conditioning roll and generally below the axis of rotation of the lower conditioning roll,*

*said conveying roller projecting downwardly below the plane of said cutting zone.*

*41. A crop harvesting header as claimed in claim 40,*

*said conveying roller comprising a single roller, unaccompanied by an upper roller forming a nip therewith.*

* * * * *